US008488740B2

(12) United States Patent
Fewster

(10) Patent No.: US 8,488,740 B2
(45) Date of Patent: Jul. 16, 2013

(54) DIFFRACTOMETER

(75) Inventor: Paul Fewster, Brighton (GB)

(73) Assignee: PANalytical B.V., Almelo (NL)

( * ) Notice: Subject to any disclaimer, the term of this patent is extended or adjusted under 35 U.S.C. 154(b) by 273 days.

(21) Appl. No.: 12/949,539

(22) Filed: Nov. 18, 2010

(65) Prior Publication Data

US 2012/0128128 A1 May 24, 2012

(51) Int. Cl.
*G01N 23/20* (2006.01)

(52) U.S. Cl.
USPC .............................................. 378/79; 378/71

(58) Field of Classification Search
USPC ..................................................... 378/70–90
See application file for complete search history.

(56) References Cited

U.S. PATENT DOCUMENTS 4,928,294 A 5/1990 Beard, Jr. et al.
2008/0013685 A1* 1/2008 Iwasaki et al. .................. 378/86

FOREIGN PATENT DOCUMENTS

| | | |
|---|---|---|
| DE | 297 16 107 | 10/1997 |
| JP | 2107952 | 4/1990 |
| WO | WO 98/58245 | 12/1998 |
| WO | WO 2007/052688 | 5/2007 |

OTHER PUBLICATIONS

C. Seitz et al. "A high-energy triple-axis X-ray diffractometer for the study of the structure of bulk crystals", Journal of Applied Crystallography, vol. 37, No. 6, Jan. 1, 2004, pp. 901-910, XP55016795, ISSN: 0021-8898, DOI: 10.1107/S0021889804023805.

Sarrazin, P et al., A Portable Non-Invasive XRD-XRF Instrument for the Study of Art Objects, Advances in X-ray Analysis vol. 52, 2008.

* cited by examiner

*Primary Examiner* — Hoon Song
(74) *Attorney, Agent, or Firm* — Leason Ellis LLP

(57) ABSTRACT

A compact powder diffractometer has one or more detectors arranged no more than 300 mm, in an example 55 mm, from a sample stage for mounting a powder sample. High resolution is nevertheless obtained in spite of the small dimensions using a geometry that achieves a suitable divergence of X-rays incident on the sample and a small spot size using a grazing exit condition on a monochromator crystal.

17 Claims, 5 Drawing Sheets

DIFFRACTOMETER

FIELD OF THE INVENTION

The invention relates to a diffractometer and a method of using it.

BACKGROUND OF THE INVENTION

High-resolution X-ray powder diffractometry enables closely spaced peaks in an X-ray diffraction pattern to be isolated, allowing greater certainty in the identification of phases present in powdered material. The purpose of high-angular resolution methods is to reduce the width of the diffraction lines, which has particular relevance for samples containing a combination of phases with closely spaced peaks, arising from similar crystal plane spacings. High-resolution is also relevant for studying powders with large crystal lattice parameters that have many peaks. The peaks in a powder diffractogram are broadened from several contributions; namely sample related aspects such as crystallite size and strain effects, instrumental contributions associated with its geometry and wavelength dispersion.

Current Methods in Powder Diffraction:

The discovery of X-ray scattering from fine powders was pioneered by Debye and Scherrer and the simplest geometry is generally termed the Debye-Scherrer camera. It operates by placing a small sample in the centre of a cylinder of film (or a position sensitive detector). The resolution can be increased by careful collimation of the incident beam and improving the ratio of the sample diameter to the detector radius. The sample dimensions ideally should be small since, as the radius is increased, the path length is increased, with the consequent loss in collected intensity. Similarly the intensity diminishes with the degree of collimation, since longer slit separations are necessary.

This geometry in its simplest form is unsuitable for high-resolution data collection, because the sample to detector distance needs to be large and the sample to be small. In practice the sample is usually mounted in a capillary or on the outside of a glass fibre resulting in typical sample sizes of 350 μm to 700 μm diameter. Therefore to achieve peak widths less than 0.10 would require radii of >200 mm or >400 mm respectively, provided that the incident beam has no divergence and there is no wavelength dispersion and no microstructure broadening.

The favoured method for achieving high-resolution powder diffractometry requires a focusing geometry, which helps to maintain intensity, and can more easily include some degree of monochromatisation. To achieve the focusing condition the sample, the divergent point of the incident beam and convergent point of the scattered beam should lie on the circumference of a focusing circle. This configuration requires a sample bent to the radius of the circle, or one that is very small in comparison with the radius of the focusing circle. The path length and quality of focusing can be difficult to maintain in practice, however it does allow parallel data collection; by placing film or position sensitive counter detectors around the focusing circle. If the sample is flat this focusing condition is not precise enough to achieve high resolution, unless the instrument has very large path lengths.

To overcome the problem of having a flat sample, the incident and scattered beams can be kept symmetrically related, so that the incident angle onto the sample is half the scattering angle 2θ can be such that the focusing condition is maintained. This is the basis of the so-called "Bragg-Brentano" arrangement. However, to capture peaks at differing 2θ values, does require rotation of the sample and the detector and therefore the data cannot be collected in parallel. This is suitable for large samples. This geometry becomes problematic at low angles without heavily restricting the incident beam divergence, although this can be done automatically with variable slits linked to the incident angle; effectively maintaining the same area on the sample visible to the incident beam.

Both these latter methods, Seemann-Bohlin and Bragg-Brentano, use a reflection geometry in which the incident X-ray beam and the measured beam leaving the sample are on the same side of the sample, which can be a problem for some low absorbing materials in that the penetration will effectively move the sample off the focusing circle and reduce the resolution. Also the resolution depends strongly upon the focus size and the receiving slit dimension. For a typical diffractometer with a radius of 240 mm and a receiving slit of 0.25 mm, negligible focus size and no wavelength dispersion, a resolution of 0.10 can be achieved.

Significant broadening may occur due to the wavelength spread. To remove some of this wavelength dispersion, e.g. isolating the Kα1 component of the Kα1 Kα2 doublet, requires some level of monochromation. Guinier added a curved single crystal to the Seemann-Bohlin camera to isolate the Kα1 component; and the beam from this was brought to a focus. This gave a very useful moderate- to high-resolution camera.

To improve the wavelength dispersion in the Bragg-Brentano geometry, the convergent focusing can be achieved with a bent single crystal as in the Guinier camera. Since the intrinsic diffraction width of a single crystal is typically 0.0030, the Kα1 component of the Kα1 Kα2 doublet can easily be isolated and focused onto the incident beam slit. The resolution now depends an the size of the slit at or the exactness of the curvature of the collimating crystal. High-resolution is relatively straightforward to achieve in reflection mode, however in transmission mode this is more problematic, because of the difficulty in bending a single crystal to such precision.

Other options in high-resolution also include monochromators in the diffracted beam.

In all cases, the means of improving the resolution requires the instrument to become significantly larger.

The size of the instrument is a very significant consideration when the use of the instrument is considered. There is a considerable need for a relatively small instrument since small instruments can generally be manufactured and transported more easily and they are much easier to fit into existing manufacturing plants.

A further factor that needs to be considered is the ease of setting up the instrument. If the instrument requires very complex setting up and calibration, it is unlikely to be suitable except in a research environment where highly skilled and experienced personnel are available. However, a diffractometer is a very useful instrument also in circumstances where such personnel are not available.

The highest resolutions are achievable using a focussing geometry and a scanning mode, however this typically requires the data to be collected in series rather than parallel.

Ideally the inventors would like to achieve high-resolution, with good intensity, use a reasonable sized sample and keep the measurement time low and the instrument small.

SUMMARY OF THE INVENTION

According to the invention, there is provided a diffractometer for measuring a powder sample, comprising:

a sample stage for holding the powder sample;

an X-ray source for emitting an X-ray beam;

a monochromator crystal having a diffraction surface arranged to diffract a monochromatic X-ray beam at a grazing exit angle of less than 5° to the diffraction surface towards the sample stage to have a spot width of less than 60 μm at the sample stage;

at least one detector crystal for measuring intensities of X-rays diffracted from the powder sample simultaneously at a plurality of diffraction angles; and processing means for calculating a diffraction pattern from the measured X-rays.

By using a small beam size at the sample and a transmission rather than a reflection geometry the incident beam defines the sample area, not the sample size. This then avoids the need for complex focussing geometries and allows the use of planar position sensitive detectors rather than curved detectors.

Preferably, the monochromator crystal is arranged to diffract the monochromatic X-ray beam incident on the sample with an angular divergence from 0.005° to 0.02°. The inventors have discovered that such a beam is well suited to powder diffraction in the geometry claimed.

A parabolic mirror may be arranged to direct the X-ray beam from the X-ray source towards the monochromator crystal. The parabolic mirror recovers the divergence of the beam from the X-ray source to produce a larger parallel beam.

The detector is a position sensitive array of detecting strips that may be arranged 0.1 m or less from the sample stage, preferably 0.075 m or less. This allows for a compact instrument whilst maintaining good resolution. For a detector with 55 μm strips, this gives maximum resolutions of 0.03° and 0.042° respectively—a typical high resolution instrument will produce typical peak widths of 0.05° to 0.1°.

The geometry chosen allows the detector to be planar.

The sample stage has a mounting surface of adhesive material for adhering a thin layer of powder sample. This allows the powder sample to be collected and mounted very simply.

The diffractometer may have a plurality of detectors arranged on alternating sides of a line passing through the sample along the incident beam direction. In this way, a complete range of angles can be covered since angles in gaps between detector crystals on one side of the line can be measured by a detector on the opposite side of the line.

The diffractometer may include means for moving the sample stage perpendicularly to the X-ray beam at the sample stage during data collection, and the processing means may be adapted to process the measured X-ray intensities whilst measurements are being made and to stop the data collection when sufficient data has been collected. This minimises the time taken to collect data.

BRIEF DESCRIPTION OF THE DRAWINGS

For a better understanding of the invention, embodiments will now be described, purely by way of example, with reference to the accompanying drawings, in which.

The drawings are schematic and not to scale.

DETAILED DESCRIPTION OF CERTAIN EMBODIMENTS OF THE INVENTION

Figure 1:
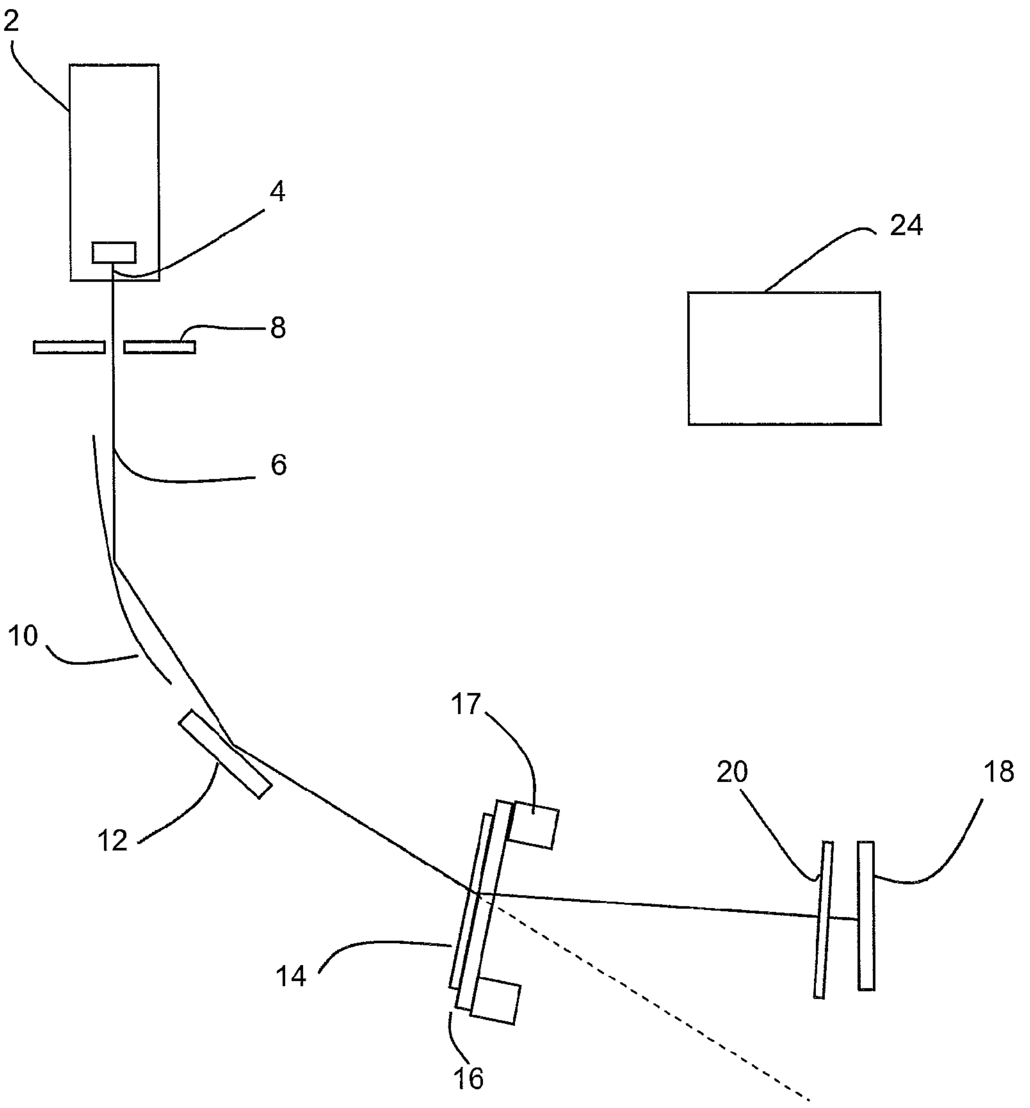
FIG. 1 is a schematic drawing of a first embodiment of the invention.

As shown in FIG. 1, in schematic form, a powder diffractometer according to the invention has an X-ray tube 2 with focus 4 generating a beam 6 of X-rays which is constrained by a divergence slit 8. The beam 6 is directed towards a parabolic mirror 10 which directs x-rays onto a crystal monochromator 12. The parabolic mirror in this case is a periodic multilayer mirror. The X-ray beam is diffracted from the crystal monochromator in a grazing exit condition towards a sample 14 mounted on a piece of adhesive tape 16 as sample holder on sample mount 17.

A detector chip 18 is arranged to measure the X-rays diffracted from the sample. The detector chip includes a plurality of detector strips arranged as an array.

The sample mount 17 is capable of rocking.

The considerations with this geometry will now be discussed in more detail.

Ideally, as much data as possible will be corrected in parallel. Complications of focusing geometries are to be avoided, as these require higher tolerances for smaller samples and detector radii as used in the diffractometer of the invention that is intended to be compact.

The aim is to create a beam that is monochromatic, small and intense, with sufficient beam divergence to bring sufficient crystallites into a position where they can scatter, and the data to be collected in parallel with a position sensitive detector. The incident beam will therefore define the scattering area rather than the sample size. In this geometry, the full sample volume is also defined by the sample thickness. If the beam is sufficiently small then focusing geometry is unnecessary to achieve high-resolution provided that the wavelength dispersion is minimised. The small incident beam is achieved using a grazing exit condition of the crystal monochromator 12. The spot of X-rays on the crystal monochromator 12 is viewed end on from the sample, which reduces the effective spot size.

A specific example was studied.

For the purpose of creating a small beam of a suitable divergence, to study powder samples, the 113 reflection from a single crystal of GaAs, with a (001) surface orientation, was used as the crystal monochromator 12.

The angular spread of the exit beam from the GaAs has been determined to be 0.0110°. This is the divergence of the beam from this monochromator. The beam leaving the mirror 10 is 1.2 mm wide and has a divergence of ~0.040° and includes a spectral distribution that covers both CuKα1 and CuKα2. The exact magnitude of this divergence is not relevant since the subsequent divergence acceptance of the GaAs collimating crystal is much less than this, in other words the crystal monochromator 12 ensures that the X-rays leaving the crystal only includes CuKα1. The axial divergence is calculated from the source, through the mirror and onto the sample.

The use of a beam with sufficient divergence, created by the low angle grazing exit condition at the GaAs crystal as collimating crystal 12, is sufficient to bring sufficient crystallites into a position for reasonably rapid measurement.

The powder sample was captured on some adhesive tape and placed normal to the beam. The data were collected with an area detector for a sample to detector radius of 55 mm. Immediately in front of the detector a 0.02 radian Soller slit 20 has been used to remove the cross-fire from an otherwise uncontrolled axial divergence. The Soller slit 20 is oriented in the plane of FIG. 1 to reduce axial divergence which would have the effect of broadening the measured diffraction lines.

Various Soller slit sizes have been used: 0.08, 0.04 and 0.02 radian and although the latter results in a greater loss of intensity the signal/noise ratio is superior. For the very highest resolution at low scattering angles the smaller Soller slits are necessary, however for rapid measurements 0.04 radian or 0.08 radian Soller slits boost the intensity in the examples given by ~>2 and ×3 improvement in peak intensities, and with a 10-20% increase in peak width at 25° 2θ, with respect to measurements using 0.02 radian Soller slits.

Figure 2:
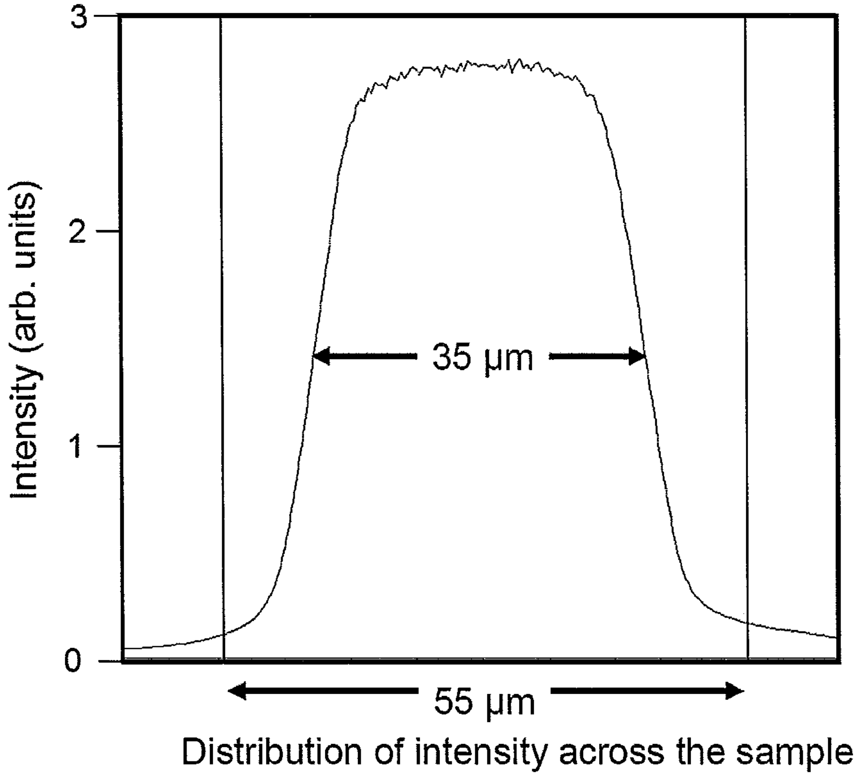
FIG. 2 shows the X-ray intensity of the X-ray beam in the embodiment of FIG. 1 across a region of the sample.

The powder sample was placed so that the distance of the beam exiting the GaAs crystal monochromator 12 to the powder sample 14 was ~30 mm. Experiments have also been performed using 20 mm and indeed 40 mm which also gave good results. Calculation gives the distribution of the intensity at the powder sample position, as shown in FIG. 2. The spot size is an effective 35 μm.

To maintain a small volume of sample for achieving high-resolution, the powder under study was collected on adhesive tape producing a layer of sample that was approximately one crystallite (3.5 μm) thick when using LaB6 (NIST 660*a* standard, with a crystallite size distribution from 2 to 5 μm). This gave a potential scattering area of ~40 μm×3.5 μm in the scattering plane and a beam 15 mm high. The intensity was measured in these experiments with a photon counting solid state pixel detector, with pixel dimensions of 55 μm×55 μm positioned at a radius of 55 mm up to 240 mm. There are 256×256 pixels and this equates to an angular range of 14° in 2θ at 55 mm radius, the signal from the pixels normal to the scattering plane are integrated into strips.

Data has been collected using a stationary detector in this mode, whilst the sample is rocked.

With this configuration the incident beam was observed at the 2θ position directly; the intensity is ~90 M counts per second, the wavelength is pure CuKα1 and the beam is contained Within one column of pixels (<0.05470). This width is composed of beam size (35 μm) and angular divergence; as mentioned above the divergence impinging on the sample is 0.0110.

The pixel size of the detector defines the angular resolution, and the scattered beam can be narrower than this width, the detector response can differ for various scenarios, e.g. when a photon arrives close to the edge of a pixel, in that the peak height, shape and width will be modified.

It is important to understand at this stage that the scattering in a powder diffraction pattern is almost entirely composed of intersections of the beam with the tails of the scattering from crystallites, rather than within the width of the Bragg peaks. Thus the scattering is more to do with the divergence of the beam that each crystallite experiences and not the spread in divergence across the whole sample. Thus each crystallite of say a few microns in combination with a distant X-ray source of say 40 microns, will effectively create a high resolution scattering profile. Hence whether the beam has a spread of divergences is not important, except that it may illuminate more crystallites. This latter point gives a method to estimate the scaling factor for the pattern, compared with the conventional Bragg-Brentano geometry.

Various calculations have been carried out to compare the intensity with an existing Bragg-Brentano configuration and these have been compared with experiment. The calculated intensity ratio is 0.236, before taking into account the effect of the smaller detector size (and so smaller X-ray aperture) in the compact geometry. Taking a detector size of 14 mm for the compact geometry discussed here and 27 mm for the Bragg-Brentano geometry, the compact geometry delivers an intensity of approximately 12% that of the existing geometry.

This might seem to be a considerable disadvantage since it would at first sight imply that data would be collected at a rate about eight times slower than in the Bragg-Brentano geometer until it is realised that in the compact geometry data can be collected in parallel, either by using multiple pixels (at different angles) on a single detector, or indeed multiple detectors.

When this is taken into account, the speed of data collection is similar using a single detector with multiple pixels. However, it is easy to provide multiple 14 mm detectors for the compact geometry and this can result in considerably faster data collection.

Figure 3:
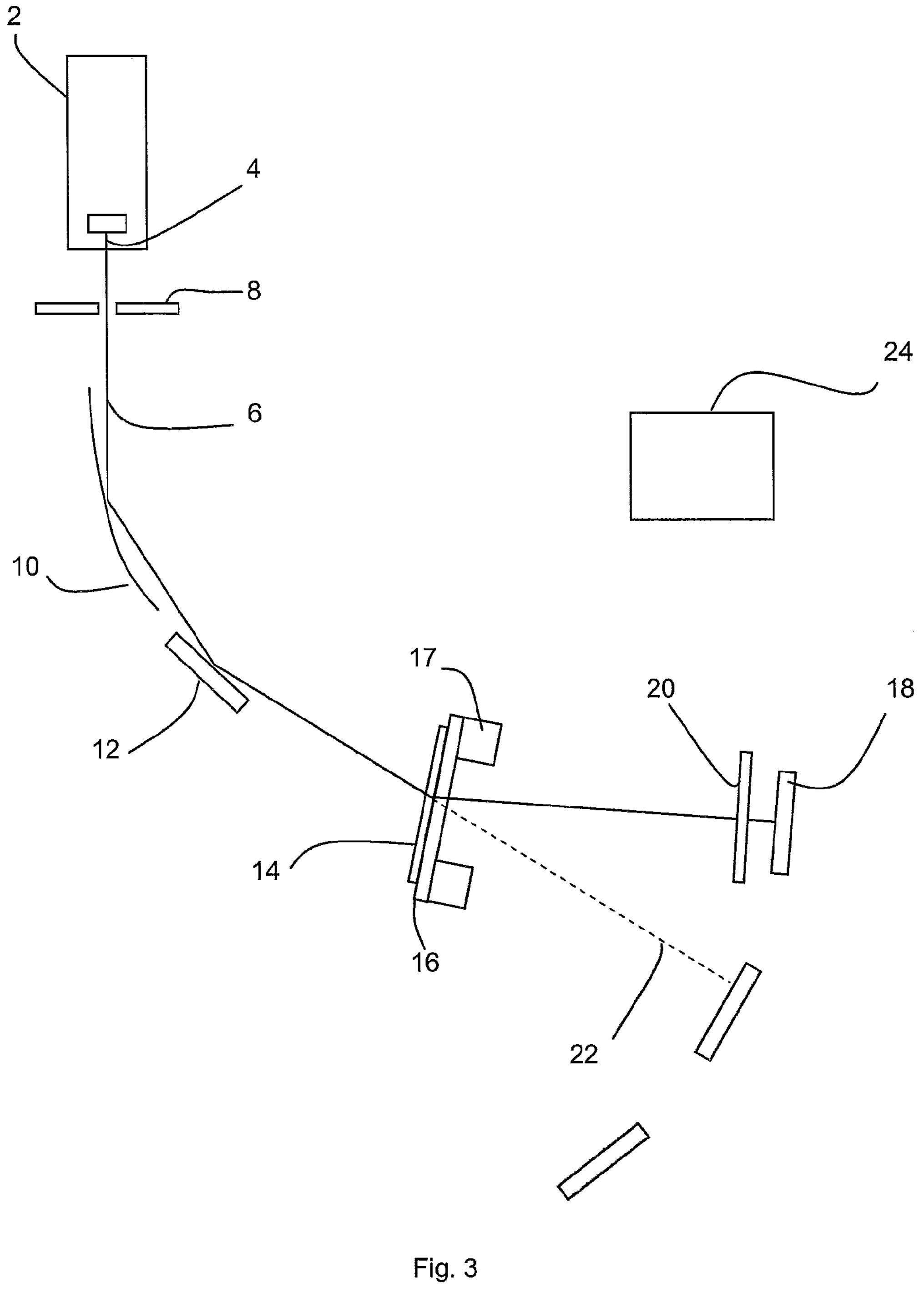
FIG. 3 is a schematic drawing of a second embodiment of the invention.

FIG. 3 illustrates an arrangement with multiple detector chips 18. In this case, the detector chips 18 are arranged on either side of undiffracted line 22 which extends in a straight line along the line of incidence of the X-ray beam 6 on the sample.

In general, the detector chips 18 have an edge region so they do not detect X-rays incident on the edge. Accordingly, it is not possible to simply abut detector chips without there being a gap in the region detected.

However, by providing the detector chips 18 on either side of undiffracted line 22 it is possible to cover diffraction angles 2θ on one side of the undiffracted line which correspond to gaps between detector chips 18 on the other side. Accordingly, it is possible to provide a continuous measurement range wider than the angle range of a single detector chip 18.

A further advantage in the present case is that the geometry works without a sample being present, unlike the Bragg-Brentano geometry. This allows for much easier calibration and correction for background.

The small size of the compact geometry does mean that accurate position of the sample 14 at the centre of rotation of the detector is quite important. Vertical and horizontal positioning to an accuracy of 50 μm is required for an angle 2θ of 90°. At lower angles 20 the tolerance is greater—for example a vertical tolerance of 120 μm and a horizontal tolerance of 600 μm for an angle 2θ of 20°.

Figure 4:
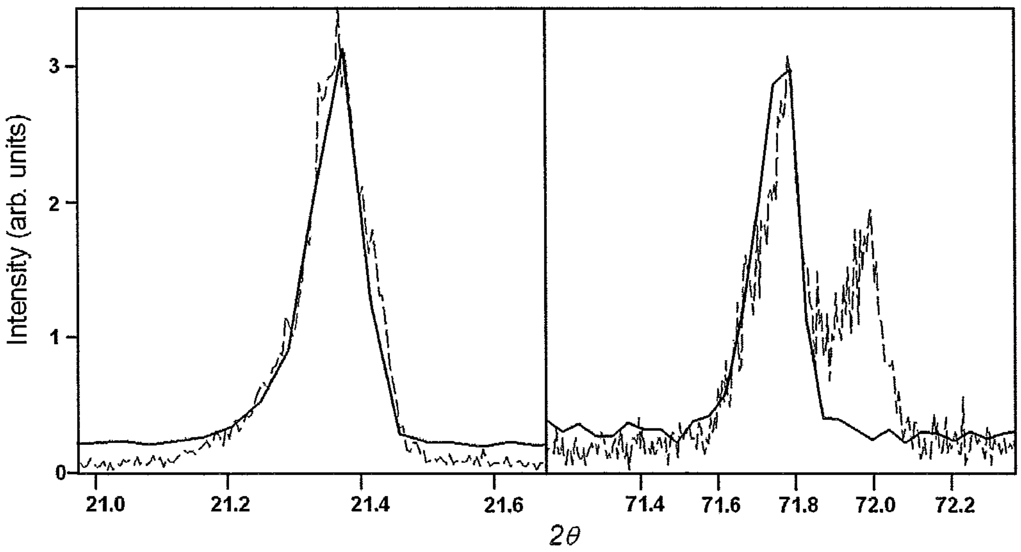
FIG. 4 shows the X-ray intensity measured for a known sample.

Measurements were taken with equipment as described. FIG. 4 illustrates a measurement on $LaB_6$, a standard sample as defined in NIST 660. Two peaks are shown. The solid line represents the intensity measured using the diffractometer according to the invention and the dotted line the intensity as measured with a conventional large and slow diffractometer using the Bragg-Brentanamo geometry. Note that the peak shapes match closely. The peak at 72.0° and bump at 24.3° are the CuKα2 contribution not present in the Compact instrument.

Figure 5:
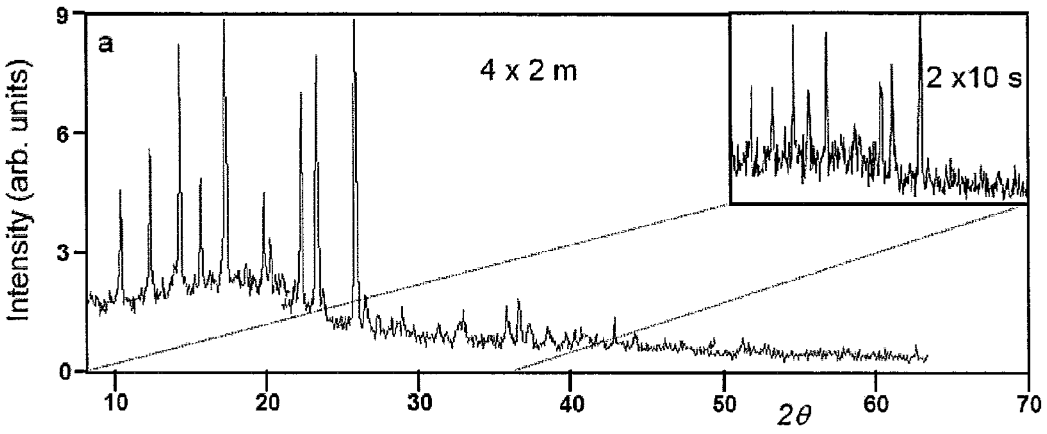
FIG. 5 shows the X-ray intensity measured on a paracetamol sample.

FIG. 5 illustrates measurements on a sample that scatters weakly, in this case paracetamol. The main graph shows good results using the diffractometer according to the invention.

It was found that data could be captured very rapidly—measurements were repeated using only a 10 s measurement time, as shown in the insert, and excellent results were obtained.

Further considerations apply to the measurements made with a compact geometry.

A particular benefit is that measurements can be made with no sample present. This allows the measurement of all components unrelated to the sample so that they can be subtracted from the measured data with the sample present. This is not the case with prior art approaches using a reflection rather than a transmission geometry.

The use of flat detectors does mean that one pixel at the centre of the detector will subtend an angle that is not exactly the same as at the edges of the detector. However, this can be corrected for by geometric calculations.

A more important factor is that in the proposed geometry the sample positioning is quite important. Any difference between the axial centre of the detectors and the sample position will result in inaccuracies in the 2θ measurement. Care is therefore required on the initial alignment of the instrument—the use of a sample stage that can be moved into the correct position is therefore convenient.

Another issue is averaging. The sample is only measured over a small volume given the small size of the incident beam spot. The number of powder crystals in this small volume may be relatively small. To increase the amount of averaging, the sample stage can be moved across the incident X-ray beam either during measurement or between measurements to increase the sampled volume. More easily, sample rocking can be used alternatively or additionally.

Measurements on the $LaB_6$ and paracetamol samples have been made to investigate the use of the instrument for microstructure analysis. The ultimate resolution of the instrument used is of order 0.01°, but this will be affected by the finite beam size and the pixel size. The peak broadening was measured at a variety of sample to detector distances. At 55 mm, the 001 profile of $LaB_6$ was found to be about 0.13°, but this reduced at 110 mm to about 0.079° and at 240 mm and 300 mm the broadening stabilised at about 0.05°. These measurements were made with the sample being rocked.

For a stationary sample, there is some variability between samples, and widths of 0.023° and 0.026° have been measured. Since the instrumental broadening is 0.019° which is close to the measured width it is likely that the full instrumental broadening is not being observed and in particular that the crysallite or crystallites contributing to the measurement are not evenly distributed over the 35 μm beam spot. Calculations reveal that the measured broadening could occur with measurements being taken on a single crystallite which would contribute instrumental broadening of 0.0115°, and a contribution off the crystallite or crystallites of another 0.0115°, based on a 0.7 μm size crystallite. For the CuKα1 wavelength used, the absorption length for $LaB_6$ is ~1 μm and will sample a depth of ~0.7 μm for the beam to enter and exit a crystallite of $LaB_6$. In this case, the sharp peak is dominated by isolated crystallites that happen to be close to the Bragg condition.

The broader peaks measured using rocking are not believed to be dominated by such isolated crystallites close to the Bragg condition since such would give the lower broadening measured with a stationary sample. This suggests that the scattering is mainly from the intersection of the diffraction tails. This suggests that it is possible to extract detailed microstructure information.

It should be noted that these excellent peak widths can be achieved at these small radii (distance from sample to detector) since the method does not depend on focussing. Even though the sample is small, sufficient particles are measured, especially in the rocking condition, to make the intensities reliable.

Those skilled in the art will realised that modifications to the geometry and arrangement shown may be made. In particular, the inventor has found that the parabolic mirror may be omitted and good results still obtained.

The invention claimed is:

1. A powder diffractometer for measuring a powder sample, comprising:

a sample stage for holding the powder sample;

an X-ray source for emitting an X-ray beam;

a monochromator crystal having a diffraction surface arranged to diffract a monochromatic X-ray beam at a grazing exit angle of less than 5° to the diffraction surface towards the sample stage to have a spot width of less than 60 μm at the sample stage;

at least one detector crystal for measuring intensities of X-rays passing through the sample having been diffracted from the powder sample simultaneously at a plurality of diffraction angles; and processing means for calculating a diffraction pattern from the measured X-rays.

2. A diffractometer according to claim 1 wherein each detector crystal is arranged 300 mm or less from the sample stage.

3. A diffractometer according to claim 1 wherein each detector crystal is arranged 100 mm or less from the sample stage.

4. A diffractometer according to claim 1 wherein the monochromatic crystal is arranged to diffract the monochromatic X-ray beam incident on the sample with an angular divergence from 0.005° to 0.02°.

5. A diffractometer according to claim 1 further comprising a parabolic mirror arranged to direct the X-ray beam from the X-ray source towards the monochromator crystal.

6. A diffractometer according to claim 1, wherein each detector crystal is planar.

7. A diffractometer according to claim 1, wherein the sample stage has a mounting surface of adhesive material for adhering a thin layer of powder sample.

8. A diffractometer according to claim 1 comprising a plurality of detector crystals, wherein the detector crystals are arranged on alternating sides of a line passing through the sample stage along the line of the monochromatic X-ray beam from the monochromator.

9. A diffractometer according to claim 1, further comprising:

means for moving the sample stage perpendicularly to the X-ray beam at the sample stage during data collection;

wherein the processing means are adapted to process the measured X-ray intensities whilst measurements are being made and to stop data collection when sufficient data has been collected.

10. A method of making diffraction measurements, comprising:

mounting a powder sample on a sample stage;

emitting an X-ray beam from an X-ray source onto a monochromator crystal having a diffraction surface arranged to diffract a monochromatic X-ray beam at a grazing exit angle of less than 5° to the diffraction surface towards the sample stage to have a spot width of less than 60 μm at the sample stage;

measuring intensities of X-rays passing through and diffracted from the powder sample simultaneously at a plurality of diffraction angles using at least one detector crystal; and calculating a diffraction pattern from the measured X-rays.

11. A method according to claim 10, wherein the detector is arranged 300 mm or less from the sample stage.

12. A method according to claim 10 wherein the monochromatic crystal is arranged to diffract the monochromatic X-ray beam incident on the sample to have an angular divergence from 0.005° to 0.02°.

13. A method according to claim 10 wherein the powder sample has a thickness no greater than 10 μm.

14. A method according to claim 10 including mounting the powder sample on a mounting surface of adhesive material on the sample stage.

15. A method according to claim 10 further comprising measuring the intensities using a plurality of detector crystals arranged on alternating sides of a line passing through the sample along the line of the monochromatic X-ray beam from the monochromator to the sample.

16. The method according to claim 10 further comprising moving the sample stage during data collection.

17. The method according to claim 10 further comprising processing the measured X-ray intensities whilst measurements are being made and stopping the data collection when sufficient data has been collected.

* * * * *